United States Patent [19]

Harrison et al.

[11] Patent Number: 5,598,935
[45] Date of Patent: Feb. 4, 1997

[54] FRAME STRUCTURE FOR LIFT CRANE MACHINERY

[75] Inventors: Don R. Harrison; Clyde B. Mabry, III; Walter A. Beer; Keith H. Childers, all of Wilmington, N.C.

[73] Assignee: American Crane Corporation, Wilmington, N.C.

[21] Appl. No.: 33,509

[22] Filed: Mar. 18, 1993

[51] Int. Cl.$^6$ ............................ B66C 23/72; B62D 25/20
[52] U.S. Cl. .......................... 212/197; 212/178; 212/308; 180/69.1
[58] Field of Search ........................... 212/191, 308, 212/195–198, 178; 180/69.1; 280/790, 797, 800, 107

[56] References Cited

U.S. PATENT DOCUMENTS

| | | |
|---|---|---|
| 1,195,058 | 8/1916 | Marfell . |
| 1,245,186 | 11/1917 | Brothers . |
| 1,497,686 | 6/1922 | Johnson . |
| 1,718,434 | 2/1928 | Ronk . |
| 1,756,106 | 4/1930 | Swenson . |
| 2,015,604 | 9/1935 | Molinelli . |
| 2,261,870 | 11/1941 | Cardwell . |
| 2,339,731 | 1/1944 | Wheat . |
| 2,368,268 | 6/1945 | Spiegel . |
| 2,408,500 | 10/1946 | West . |
| 2,759,563 | 8/1956 | Marnon et al. . |
| 2,916,172 | 12/1959 | Locke . |
| 3,435,961 | 4/1969 | Hamson . |
| 3,645,350 | 2/1972 | Deli et al. ............................ 180/69.1 |
| 3,726,416 | 4/1973 | Pottorff et al. ....................... 212/178 |
| 3,779,330 | 12/1973 | Longpre ............................... 180/69.1 |
| 3,792,781 | 2/1974 | Blase et al. ........................... 212/178 |
| 3,851,776 | 12/1974 | Leyrat . |
| 3,866,939 | 2/1975 | Fanslow . |
| 3,891,095 | 6/1975 | Symmahk . |
| 3,924,753 | 12/1975 | Lamer . |
| 4,000,784 | 1/1977 | Morrow, Sr. et al. . |
| 4,081,081 | 3/1978 | Morrow, Sr. et al. . |
| 4,196,816 | 4/1980 | Dvorsky et al. . |
| 4,204,603 | 5/1980 | Ducreuzet . |
| 4,363,412 | 12/1982 | Patel et al. ........................... 212/196 |
| 4,380,107 | 4/1983 | Andress . |
| 4,483,448 | 11/1984 | Wittman et al. . |
| 4,494,906 | 1/1985 | Brocklebank . |

(List continued on next page.)

FOREIGN PATENT DOCUMENTS

| | | |
|---|---|---|
| 26494 | 2/1984 | Japan ................................... 212/196 |
| 516635 | 6/1974 | U.S.S.R. . |
| 964154 | 5/1962 | United Kingdom . |
| 2159122 | 11/1985 | United Kingdom . |

OTHER PUBLICATIONS

Pamphlet for 800 Series Truck Crane, published earlier than Mar. 18, 1992.

Pamphet for 8470 Carrier crane, published earlier than Mar. 18, 1992.

*Primary Examiner*—Karen B. Merritt
*Assistant Examiner*—R. B. Johnson
*Attorney, Agent, or Firm*—Watts, Hoffmann, Fisher & Heinke

[57] ABSTRACT

A lift crane having enhanced lifting capability includes a self-installing counterweight system which utilizes actuators forming part of a counterweight assembly for raising the counterweight to an operative position with respect to the rear of the crane. A pair of slidable counterweight beams are slidably supported within main frame members forming part of the upper works of the crane and have their outer ends attached to the counterweight. Fluid pressure operated actuators within the frame members extend and retract the beams in order to move the counterweight rearwardly with respect to the rear of the crane. The upperworks also includes spaced-apart, parallel frame members each having a pair of spaced-apart vertical side plates with integral flange sections extending upwardly. The flanged sections include mounting locations for hoist machinery which utilize pins for easily mounting and dismounting the equipment. Drip pans including drain plugs are provided and located below machinery components that are likely to discharge fluid.

2 Claims, 8 Drawing Sheets

U.S. PATENT DOCUMENTS

| | | |
|---|---|---|
| 4,511,974 | 4/1985 | Nakane . |
| 4,516,116 | 5/1985 | White . |
| 4,518,305 | 5/1985 | Stuhrmann . |
| 4,537,317 | 8/1985 | Jensen . |
| 4,557,390 | 12/1985 | Mick . |
| 4,614,275 | 9/1986 | Zeno . |
| 4,729,486 | 3/1988 | Petzold et al. . |
| 4,867,321 | 9/1989 | Montgon . |
| 4,953,722 | 9/1990 | Becker et al. . |
| 4,995,518 | 2/1991 | McGhie ................................. 212/196 |
| 5,035,337 | 7/1991 | Juergens . |
| 5,141,195 | 8/1982 | Toda . |

FRAME STRUCTURE FOR LIFT CRANE MACHINERY

TECHNICAL FIELD

The present invention relates generally to lift cranes and, in particular, to a new and improved mobile lift crane having enhanced lift capability and enhanced serviceability.

BACKGROUND ART

Conventional lift cranes include a upper body or upper works which is typically rotatable about a vertical axis with respect to a lower works or carbody. The tipper works typically supports a boom or mast and carries lift machinery for raising and lowering the boom as well as machinery for operating the lifting hoist. The carbody in mobile cranes, typically includes a crawler-type drive system including a pair of track assemblies driven by a suitable drive motor or motors.

The lifting capacity of a crane is determined at least in part by the geometry of the base, since all of the compression and tilting loads must act through the base which is in contact with the ground. The need for increased crane capacity has been partly met by larger sized cranes having bigger carbodies, both for more strength and to further space the fulcrum or tipping point of the crane from the counterweight effective line of action. Larger cranes have also been provided with increasing amounts of counterweight carried on the rotatable upper works which resist the overturning moment of larger loads.

Cranes having auxiliary counterweights and/or movable counterweight mechanisms have been suggested in the past. U.S. Pat. No. 5,035,337 illustrates an example of a crane having auxiliary counterweights which are used in order to lift heavy loads. U.S. Pat. No. 4,557,390 illustrates a suspended counterweight system in which a separate counterweight is supported by a separate counterweight boom..

U.S. Pat. Nos. 4,729,486 and 4,953,722 illustrate mechanisms for providing a counterweight that is movable along a beam extending from the rear of the upper works. In the '486 patent, an actuator operating a chain drive is provided for selectively moving the counterweight along the beam is disclosed.

Large capacity mobile cranes often have to be disassembled in order to transport the crane to a job site. In some instances, the upper works is separated from the carbody and the individual units are transported to the job cite and reassembled. In at least some large capacity cranes, the counterweight is also separately transported and is installed onto the upper works at the job site. Attempts have been made to simplify the installation of the counterweight. U.S. Pat. No. 4,081,081 illustrates an example of a crane in which provision has been made for mounting and demounting a counterweight.

DISCLOSURE OF THE INVENTION

The present invention provides a new and improved lift crane having enhanced lift capability and enhanced serviceability. According to the invention, the crane includes a self installing counterweight system which includes a counterweight assembly having a weighted counterweight and at least one fluid pressure operated actuator forming part of the counterweight assembly.

During installation, a source of pressurized fluid is communicated to the counterweight assembly in order to provide a means for extending and retracting the actuator with respect to the counterweight. In the illustrated embodiment, during installation, the actuator is extended upwardly and coupled to the crane. The actuator is then retracted to raise the counterweight from ground level to a position in alignment with a counterweight support forming part of the crane. Once in position, the counterweight is attached to the crane and the actuator is then decoupled from the crane.

In the preferred and illustrated embodiment, the counterweight assembly is attached to a laterally extendable support which in the preferred embodiment comprises a pair of extendable beams forming part of the crane. When the counterweight is raised to its operative position, the support beams are extended into a predetermined position with respect to the counterweight, whereupon the actuator is extended to lower the counterweight onto the support beams. In the exemplary embodiment, the counterweight includes downwardly depending lugs that are received in apertures formed in the counterweight support beams. Locking bolts are then used to secure the counterweight assembly to the beams.

In the preferred embodiment, two actuators are used in the counterweight assembly and operate in unison. According to a feature of the invention, the actuators perform a dual function. During installation, they are extended upwardly to engage structure on the crane by which the counterweight is raised to its operative position. Once installed, upper parts of the actuators are locked as by pins, to the counterweight to prevent movement. Lower ends or rods of the actuators are uncoupled from the counterweight so that energization of the actuator produces downward movement in the lower end of the actuators. The lower end of the actuators are in turn attached to a stabilization foot so that under predetermined operating conditions, the operating foot is extended in order to provide support for the crane, should a load condition be encountered (such as a cable failure) in which the crane would otherwise tip rearwardly.

According to another feature of the crane, a pair of spaced apart frame members form the load bearing structure to which hoist machinery and the crane boom are attached. In the preferred embodiment, each frame member includes at least one vertical side plate including an integral flange section extending upwardly above a general plane of the frame member, to which the machinery is releasably attached. In the illustrated embodiment, each frame member includes a pair of spaced apart side plates each having upwardly extending flange sections. Stanchions forming part of the crane machinery are coupled to the flange sections using easily removable pins. With this feature of the invention, machinery can be easily removed for replacement and/or when repair or service is necessary.

According to a another feature of the invention, the main frame members are square or rectangular in cross-section and define housings for receiving the counterweight support beams. In particular, the counterweight support beams are slidably supported within the frame members. Fluid pressure operated counterweight extension actuators are also mounted within the frame members and are reciprocally moveable in order to extend and retract the beams and hence, the counterweight assembly.

According to a feature of the invention, the supply of pressurized fluid for extending and retracting the counterweight extension actuators, is at least partially controlled by a load moment indicator which monitors the load and configuration, i.e., boom angle and boom out radius, of the crane. The load moment indicator inhibits the supply of pressurized fluid to either retract or extend the counterweight extension actuators under certain operating conditions that would produce instability in the crane. Movement of the counterweight assembly towards and away from the rear of the crane is effected by the operator in connection with a display panel mounted within the operator cab that includes a load indicator.

According to another feature of the invention, the machinery deck includes drip pans extending laterally from the main frame members which collect fluid discharge by components located within the upperworks of the crane. The drip pans include drains which are used to discharge collected fluid under controlled conditions.

Additional features of the invention will become apparent and a full understanding obtained by reading the following detailed description made in connection with the accompanying drawings:

BEST MODE FOR CARRYING OUT THE INVENTION

Figure 1:
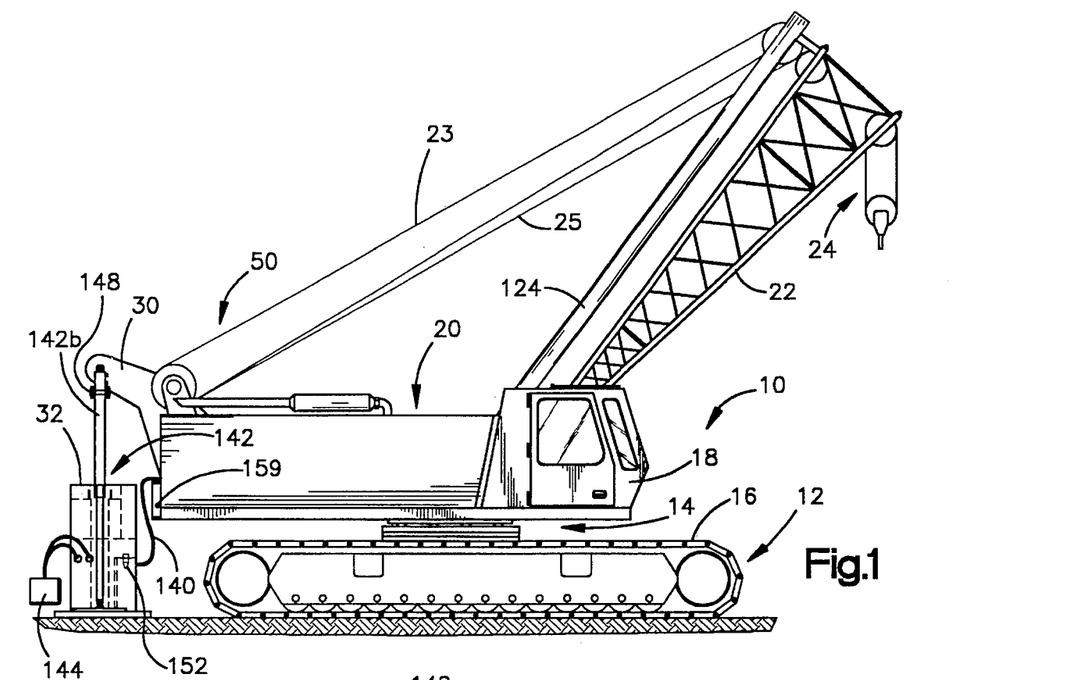
FIG. 1 is a side elevational view of a mobile lift crane constructed in accordance with the preferred embodiment of the invention.

FIG. 1 illustrates a mobile crane constructed in accordance with the preferred embodiment of the invention. As is conventional, the crane includes a rotatable upper works 10 and a lower works or carbody 12. The upper works is rotatably connected to the carbody through a coupling indicated generally by the reference character 14 which includes a large rotary bearing that mounts a bull gear.

The carbody 12 includes a crawler type drive mechanism (not shown in detail) for driving a pair of tracks 16 (only one of which is shown) to effect movement in the crane when desired. The carbody 12 is considered conventional and does not form part of the present invention.

The upper works 10 includes an operator cab 18 mounted ahead of and to one side of a machinery compartment 20. A boom 22 is pivotally attached to the upper works and is raised and lowered using cables 23 that are extended or retracted by machinery located within the machinery housing 20. For purposes of explanation, only a partial boom is shown in the Figures. It should be understood, that a more conventional, elongate boom would more typically be mounted to the upper works. A lift or hoist assembly 24 is used to lift and lower loads. The hoist machinery within the machinery compartment extends and retracts cabling 25 in order to raise and lower the load attached to the hoist.

In accordance to one preferred embodiment of the invention, a pair of counterweight support arms 30 (only one is shown) extend upwardly and rearwardly from the upper works and are used to install a counterweight assembly 32 onto the rear of the crane. In the preferred embodiment, the counterweight 32 is removable to facilitate transport of the crane to a job site.

In the preferred embodiment, the counterweight assembly 32 is attached to a pair of extendable beams 34 (shown best in FIG. 4) which are used to move the counterweight 32 rearwardly in order to enhance the lifting capability of the crane. By extending the counterweight rearwardly, the boom 22 can be boomed outwardly a greater distance for a given load. When the enhanced lifting capability is not needed, the counterweight is retracted so that it is adjacent the rear of the crane.

Figure 4:
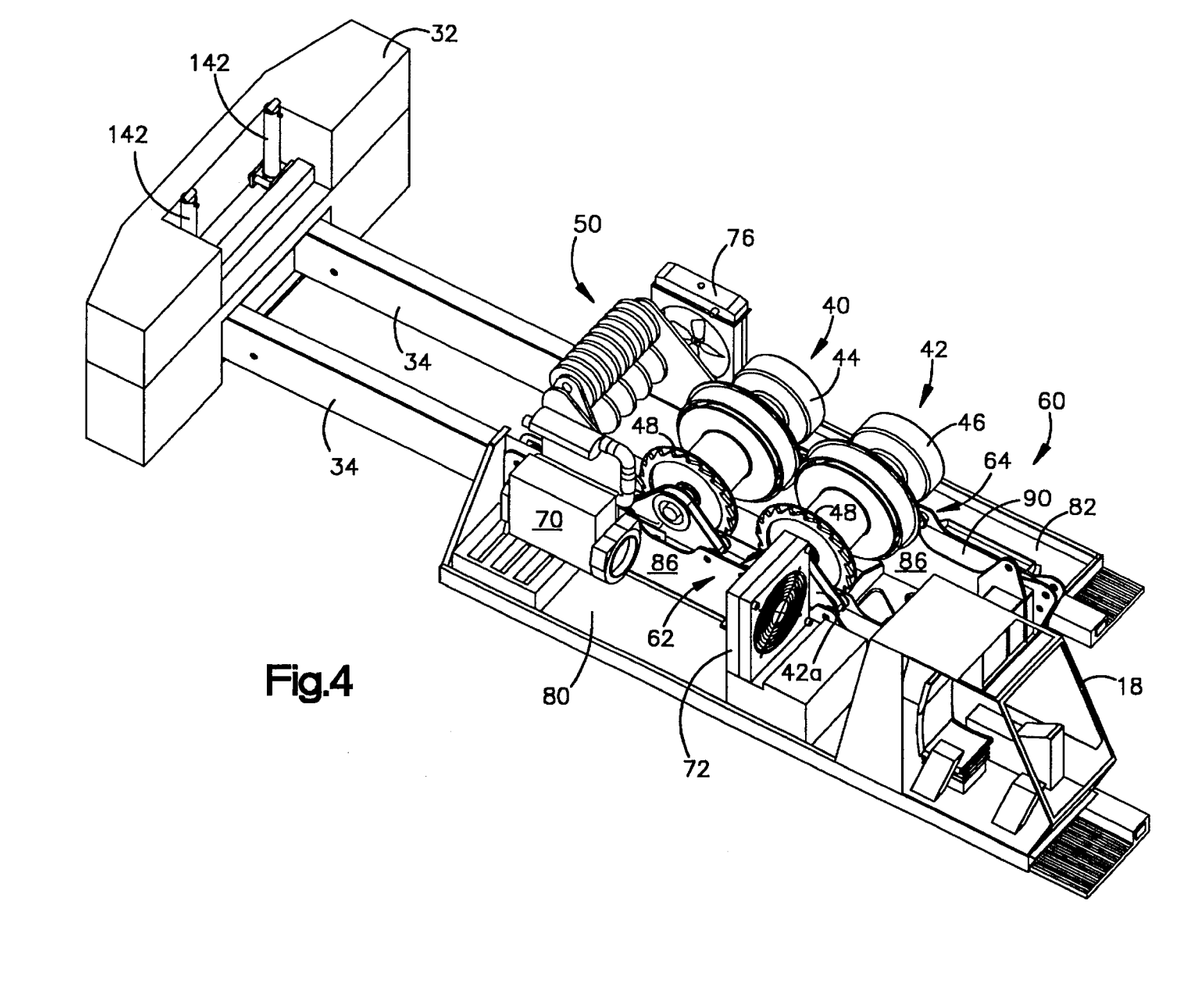
FIG. 4 is an isometric view of a machinery compartment forming part of the crane shown in FIG. 1.
Figure 5:
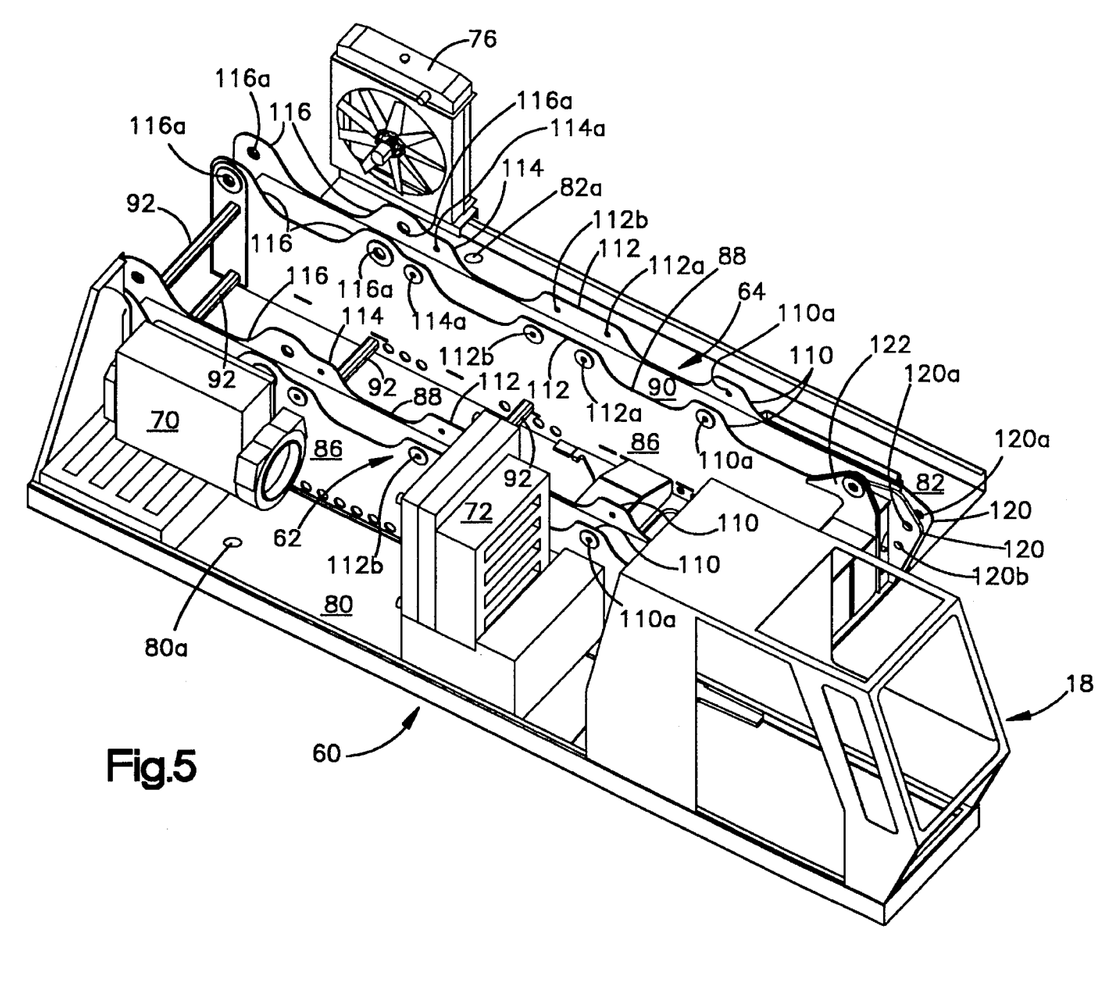
FIG. 5 is an isometric view of the machinery compartment, with components removed to show additional details.

Turning now to FIGS. 4–8, the internal construction of the upper works is illustrated. In particular, FIG. 4 illustrates the machinery housed within the upper works whereas FIG. 5 provides details of the frame and other support structure forming part of the upper works.

As seen best in FIG. 4, the upper works mounts two hoisting drums 40, 42 onto which hoist cabling 25 (see FIG. 1) is wound and unwound. As is known, for some applications only one load hoisting drum is required. Typically the crane would require an additional hoisting drum (not shown) which is used to lower or raise the boom 22 via cable 23.

In the illustrated embodiment, the hoisting drums are driven by hydraulic motors 44, 46. A ratchet 48 forms part of each hoisting drum and provides a mechanical stop to lock the drums against rotation in the unwinding direction. The hoisting drums would also include conventional friction brakes. A pulley assembly 50 controls movement and maintains alignment of the various cables that control movement in the boom 22 and the load hoist 24.

Referring also to FIG. 5, the upper works includes a machinery deck indicated generally by the reference character 60 to which components are mounted as well as a pair of frame members 62, 64 to which the hoist machinery 40, 42 and boom 22 are mounted. The frame members 62, 64 are substantially similar and may be identified. The deck and/or frame members mount a conventional diesel engine 70 which is operatively connected to a hydraulic pump (not shown) that provides the necessary pressurized fluid for the hydraulic motors 44, 46 and other hydraulic components and drive motors not shown. A radiator 76 provides cooling for the engine 70. A hydraulic system cooler or radiator 72 is also provided to cool the hydraulic fluid.

According to a feature of the invention, the machinery deck includes integral drip pans 80, 82 mounted below components that are likely to emit or leak fluids. As seen best in FIG. 4, the drip pan 80 is mounted below the diesel engine 70 and hydraulic pump and contains anything that drips or leaks from these components. Drains 80a, 82a are opened periodically in order to drain collected fluids into a suitable container. With the disclosed drip pan construction, uncontrolled release of fluids onto a job site is inhibited. The drip pan 82 catches and contains any fluid leak by the hydraulic motors 44, 46.

According another feature of the invention, the primary load supporting structure comprises the spaced-apart, box-like frame members 62, 64 which are interconnected by stand-offs 92. In accordance with the preferred construction, each frame member 62, 64 comprises a pair of side plates 86, 88 welded to upper and lower cross pieces 90 (only the upper cross piece is shown). As seen best in FIG. 5, the side plates 86, 88 define upwardly extending, parallel, integral flanges to which the hoist and other machinery is mounted. With the disclosed construction, assembly of the machinery to the machinery deck is greatly facilitated and moreover, service and replacement of the components are easily effected rendering a very serviceable crane.

Figures 7, 8:
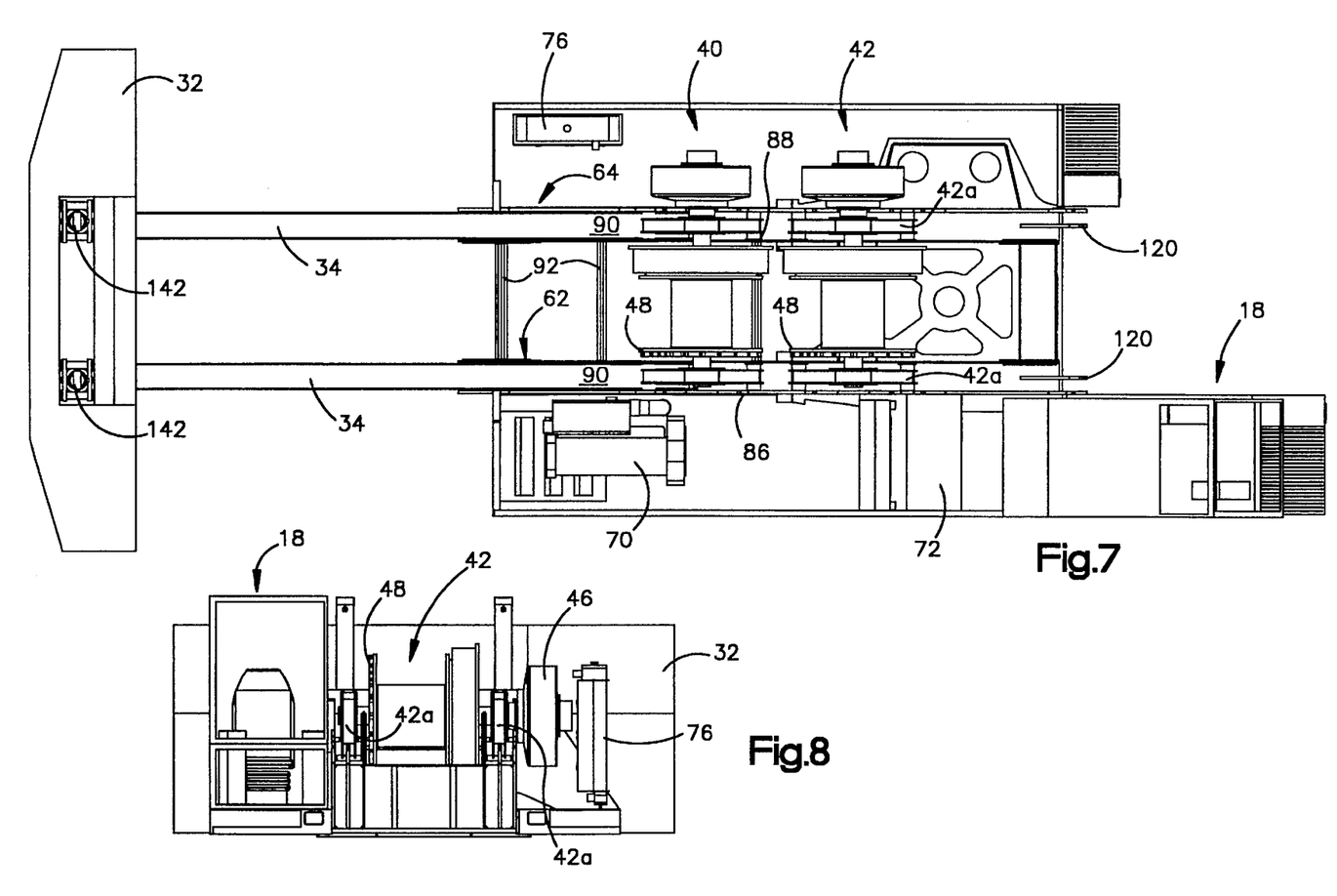
FIG. 7 is a top plan view of the machinery deck.
FIG. 8 is a front view of the machinery deck shown in FIG. 4.

Referring also to FIG. 7, the forward hoist assembly 42 is secured to flange sections 110, 112 formed on the side plates 86, 88 of both frame members 62, 64. The flange sections 110, 112 define bores 110a, 112a (shown best in FIG. 5 which serve as mounting points for hoist assembly stanchion 42a (shown best in FIG. 7). To further facilitate installation or removal, pin connections may be provided for securing the hoist drum stanchions to the flange sections 110, 112. The stanchion 40a of the rear hoist drum assembly 40 are secured to flange sections 114, 112 and, in particular, via mounting holes 114a, 112b. Similarly, stanchion 50a that support the hoist pulley assembly 50 are mounted to flange section 116 which includes mounting holes 116a.

At the forward end of each beam 62, 64, the side plates 86, 88 define boom mounting flanges 120, including mounting holes 120a, 120b for receiving pins that interconnect the boom 22 to the frame members 62, 64. A pair of mounting plates 122 (only one is shown in FIG. 5) are provided on the machinery deck and serve as an anchoring point for a floating mast 124 (shown in FIG. 1).

Figure 6:
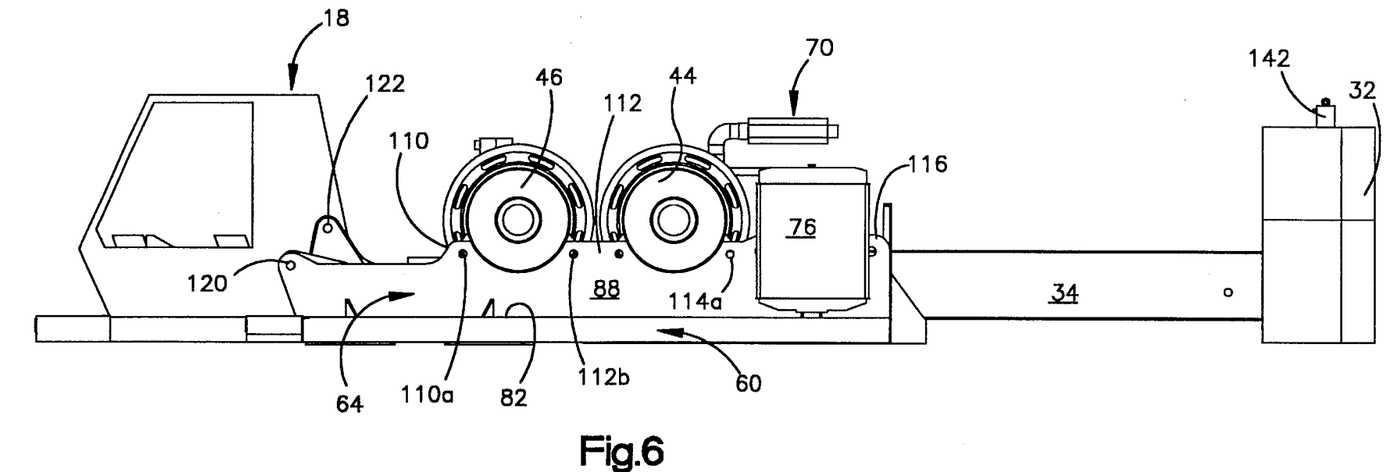
FIG. 6 is a side elevational view of the machinery deck shown in FIG. 4.
Figure 9:
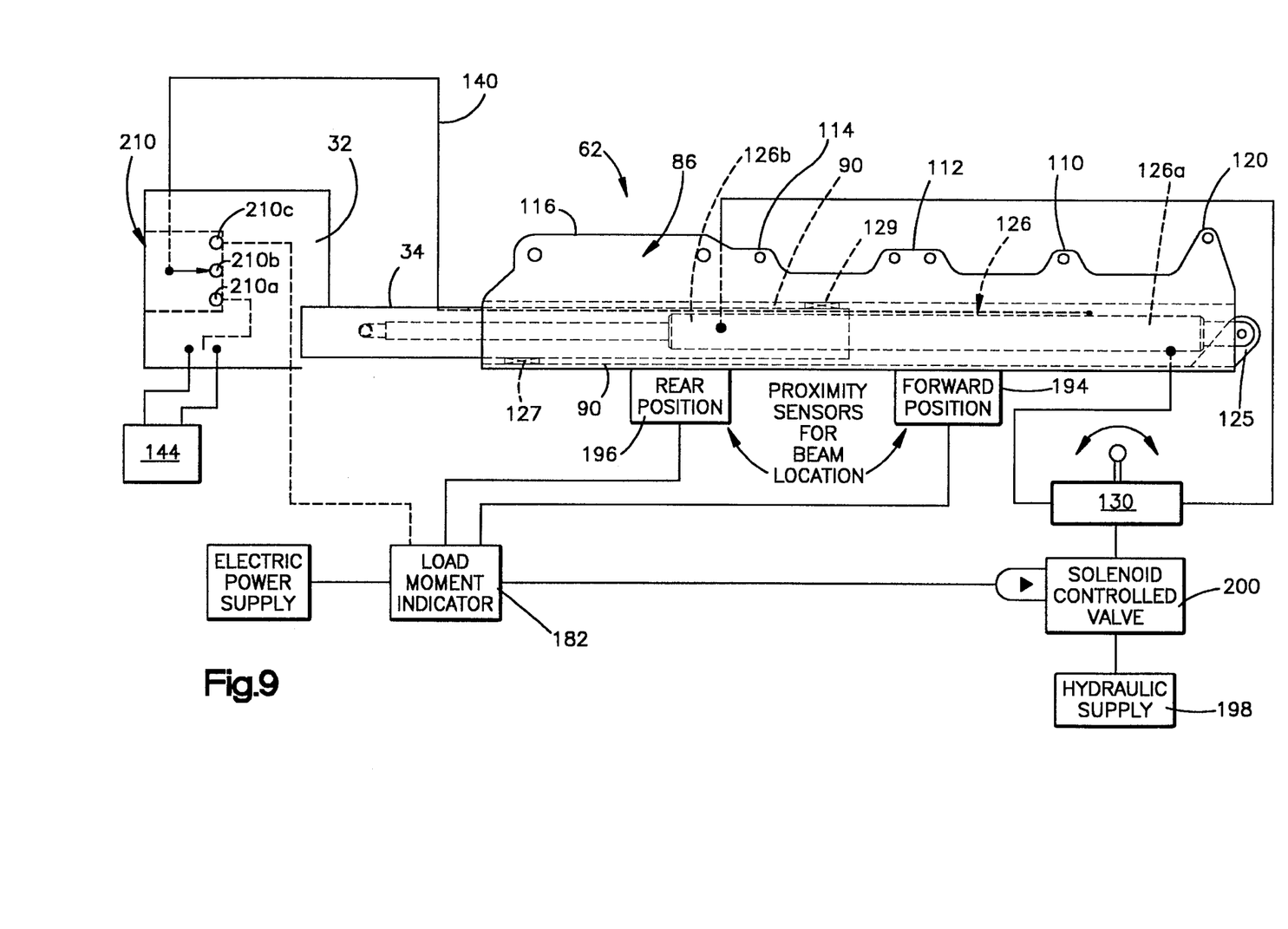
FIG. 9 illustrates somewhat schematically the counterweight extension mechanism and control system therefor.

According to another feature of this construction, the frame members 62, 64 also form support housings for extendable beams 34 that are used to extend and retract the counterweight 32 with respect to the rear of the crane. Referring also to FIGS. 6, 7 and 9, the counterweight extension beams 34 are formed by box channels which are sized to fit within the frame members. A hydraulic actuator 126 (shown best in FIG. 9) in each frame member 62, 64 includes a rod end pinned to the extension beam 34. The cylinder end of each actuator 126 is fixed to the machinery deck by a pin/plate arrangement 125. Extension of the actuators 126 extends the beams 34 and vice versa.

The counterweight extension beams 34 are slidably supported within the main frame members. As seen best in FIG. 9, an anti-friction pad 127 is fixed to the rear end of each frame member and slidably supports the underside of the associated extension beam 34. A corresponding anti-friction pad 129 is fixed to the forward end of each extension beam 34 and slides along the underside of the cross piece 90 forming part of each frame member. Additional lubrication for the anti-friction pads 127, 129 may also be provided.

Figure 2:
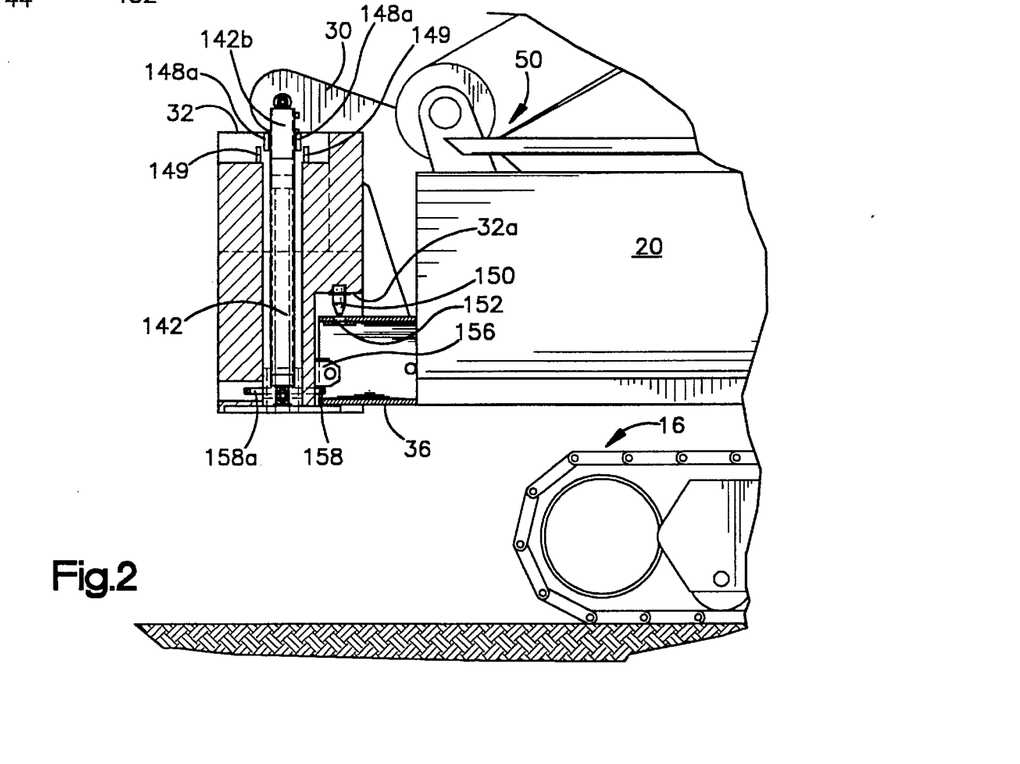
FIG. 2 is a fragmentary side view, partly in cross-section, of the crane shown in FIG. 1 with a counterweight shown in a partly installed condition.
Figure 3:
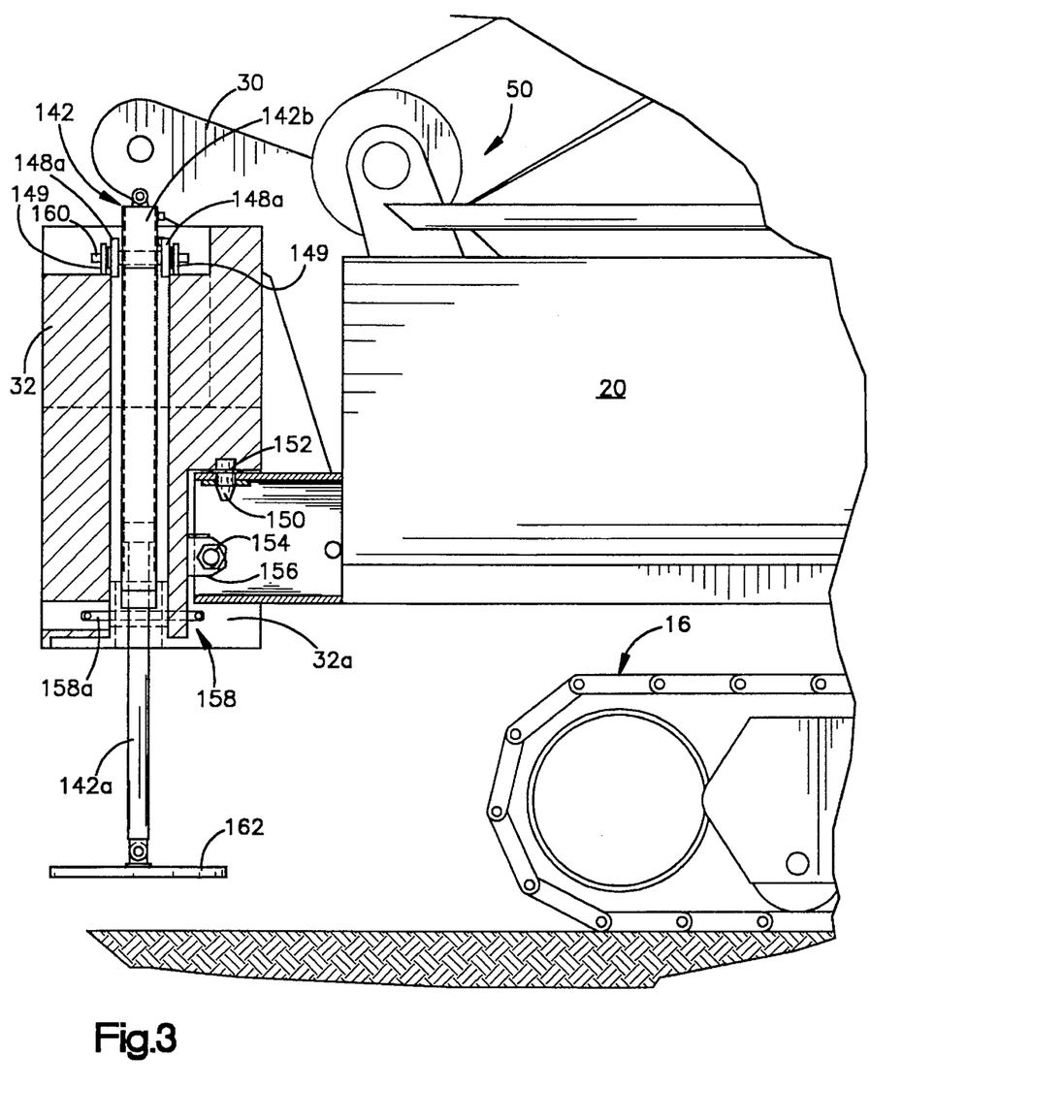
FIG. 3 is fragmentary side view, partly in cross-section, of the crane shown in FIG. 1 illustrating an operative position for a support foot forming part of the counterweight shown in FIG. 2.

Hydraulic pressure under the control of an operator control 130 is applied to the cylinder end 126a of each actuator in order to effect concurrent extension of the counterweight support beams whereas pressure supplied to the rod end 126b of each cylinder effects retraction of the beams 34 and hence, movement of the counterweight 32 towards the rear of the crane. Returning now to FIGS. 1–3, features regarding the counterweight assembly 32 are illustrated. As indicated above, the counterweight 32 is removable to facilitate transportation of the crane to a job site. As seen in FIG. 1, the counterweight 32 to be installed is positioned adjacent the rear of the crane. It should be noted that the crane itself can be used to initially position the counterweight and to unload it off the transportation vehicle. Once in position, hydraulic and electrical connections indicated generally by the reference character 140 are made to the counterweight 32. As seen in FIGS. 2 and 3, the counterweight includes a pair of hydraulic actuators 142. The connections made between the crane and the counterweight 32 provide the necessary pressurized fluid for the actuators 142 whereas an electrical connection provides the power for controlling the application of pressurized fluid to the actuators via solenoid control valves (not shown). A control box indicated generally by the reference character 144 (shown only in FIG. 1) includes controls for individually activating the hydraulic cylinders 142 mounted within the counterweight 32.

As seen best in FIG. 2, each actuator 142 can be pinned or locked to the upper end of the counterweight 32 or the lower end of the counterweight, or both. Referring also to FIG. 1, the upper end of the cylinder 142b of the actuator 142 includes a trunion 148, including a pair of trunion plates 148a. Referring to FIG. 3, when the cylinder end 142a of the actuator 142 is in a lower position, the trunion plates 148a which include aligned apertures (not shown) are also aligned with apertured locking tabs 149 forming part of the counterweight 32 and located in a recess near the top of the counterweight. A pin 160 is installed through the aligned apertures in order to lock the upper end 142b of the actuator 142 to the top of the counterweight 32. When locked in the position shown in FIG. 3, the application of fluid pressure to the actuator 142 does not produce upperward movement in the actuator.

To install the counterweight, the pins 160 are removed and the actuators 142 are extended upwardly (as seen in FIG. 1). In the illustrated arrangement, the actuators are oriented with the rod ends down. To raise the actuators the top ends or cylinder ends of the actuators 142 are pressurized. The top end of the actuators are coupled to the respective counterweight support arms 30 using suitable pins or alternately bolts. Referring to FIG. 2, the actuators 142 are then retracted (by pressurizing the rod ends of the actuators), which, in effect, causes the counterweight 32 to be pulled upwardly towards the counterweight support arms 30. Upon reaching a predetermined height, the counterweight extension beams 34 are extended rearwardly to the position shown in FIG. 2. In this position each beam 34 enters a recess 32a formed within the counterweight 32 and is aligned with a mounting lug 150. Each extension beam 34 includes an aperture 152 for receiving the associated mounting lug 150. After the counterweight 32 and extensions beams 34 are properly aligned, the actuators 142 are extended to lower the counterweight 32 so that the mounting lug 150 enters the lug opening 152 defined in each extension beam 34. Engagement of the mounting lug 150 with the lug aperture 152 is shown in FIG. 3. The counterweight is then secured in position by a bolt 154 which extends through tabs 156 formed on the counterweight 32 and through an aperture 159 shown in FIG. 1 formed in each extension beam 34. The bolt 154 restrains the counterweight 32 from upward movement which would otherwise dislodge the connection between the lug 150 and the associated lug aperture 152 formed in each extension beam 34.

According to the preferred construction, the actuators 142 provide a mechanism for providing a stabilization foot for the counterweight 32 to inhibit rearward tipping of the crane when the counterweight is extended and a load is released unexpectedly, such as occurs upon failure of a cable. According to this feature, the upper part of each actuator 142 is locked to the counterweight 32 by the pin arrangement 160 (described above and shown in FIG. 3), indicated generally by the reference character.

A second pin arrangement 158 is also provided for releasably locking the lower ends or rods 142a of the actuators 142 to the base of the counterweight 32. In the illustrated embodiment, a pin 158a is used to releasably lock the rods 142a of the actuator 142 to the base of the counterweight 32. The rods 142a of the actuators 142 (as seen best in FIG. 3) are normally locked or pinned to the counterweight 32 during the installation process and in conditions when the counterweight is not to be extended by the beams 34. When the counterweight 32 is to be extended, the rods 142a of the actuators 142 are released, allowing them to extend downwardly when pressurized fluid is communicated to the cylinder ends of the actuators 142.

In the preferred embodiment, a support foot 162 is mounted to the end of the actuators 142. Energization of the actuators 142 causes the foot 162 to move towards ground level (provided that the pins 158c are removed). In the preferred operational method, the foot 162 is extended to a predetermined distance above ground level, and as indicated above, acts as an abutment or stop to restrain the crane from tipping excessively should an unexpected load change occur when the counterweight is extended.

The rods 142a of the actuators 142 may include a trunion similar to the trunion 148 mounted at the upper end of the actuator cylinder 142b to provide the pinning feature. Alternately, the foot 162 may include locking tabs (not shown) having apertures through which the pin or pins 158a extend in order to restrain the rods 142b and hence the foot 162 from moving either upwardly or downwardly. By installing the upper pins 160 and removing the pins 158a, energization of the actuators 142 moves the foot 162 downwardly towards ground level.

In the preferred embodiment, controls for extending and retracting the counterweight 32 are interconnected with a load moment indicator/monitoring system. In particular, the control system for extending the counterweight 32 is only enabled if a sufficient moment force is being exerted by the boom 22. As is known, the moment force applied by the boom 22 is determined by the load being lifted, as well as the position of the boom. The further the boom is boomed outwardly, the greater the moment force for a given load. In accordance with this feature, controls for the hoisting the load and for positioning the boom are also interconnected with the counterweight control system such that hoist operation, which would produce a moment force that is too low, is inhibited when the counterweight is extended. Under these conditions, operation of the hoist or boom position control equipment is inhibited until the counterweight 32 is retracted.

Figure 10A:
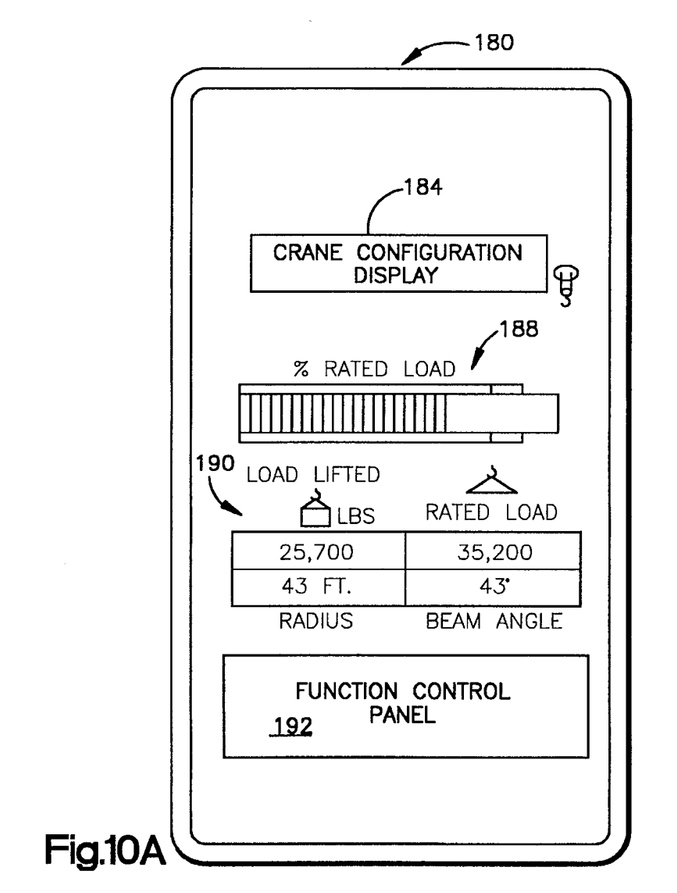
FIG. 10A illustrates, somewhat schematically, the display panel of a load moment indicator forming part of the crane control system.

FIG. 9 illustrates, schematically, a control system for extending and retracting the counterweight 32 with respect to the rear of the crane. In the preferred embodiment, control of the actuators 126 is effected by the operator using a control valve 130 and based on information displayed on a panel in the operator's cab. FIG. 10A illustrates a display panel 180 which is at least partly controlled by a load moment indicator 182 (shown in FIG. 9). The panel 180 includes an illuminated display 184 which displays the current crane configuration. Immediately below, the configuration display 184 is a load indicator panel 188 which displays the percent of rated load that is currently being experienced by the crane. This indicator 188 is automatically changed by the load moment indicator control 182 system as a function of the position of the counterweight 32.

Immediately below the load indicator is a panel 190 that displays current crane-loading conditions. For example, in the panel 190 shown in FIG. 10A, the load currently being lifted by the crane is 25,700 pounds. The boom is angled at 43° and the radius of the load with respect to the center line of rotation of the crane is 43 feet. The crane is capable of lifting 35,200 pounds with the boom at 43°.

A panel 192 immediately below the load panel 190 is a conventional function control panel.

The percent of rated capacity is determined by the length of the boom and the boom angle. The load is determined by monitoring the load placed on the boom suspension. It should be apparent that the percent of rated capacity will change depending on the position of the counterweight assembly with respect to the crane. Referring to FIG. 9, sensors 194, 196 sense the forward and rear positions of the counterweight. As seen in FIG. 9, the sensors 194, 196 are interconnected with the load moment indicator 182 so that the display 188 will reflect the percent of rated load at a given counterweight position.

Since extension of the counterweight from the crane can produce instability in the crane if a sufficient load is not placed on the boom, the control system inhibits operation of the actuators 126 if sufficient load is not present. In the preferred embodiment, the communication of pressurized fluid from a supply 198 to the operator control 130 is controlled by a solenoid-operated control valve 200. The electrical signal for energizing or de-energizing the valve 200 is controlled by the load moment indicator.

The load moment indicator 182 provides an electrical signal to the solenoid controlled valve 200 under predetermined operating conditions. For example, with the counterweight in a retracted position, the load moment indicator de-activates the solenoid valve until the crane reaches 60% of its capacity (as measured by the load moment indicator and associated hardware).

Figure 10B:
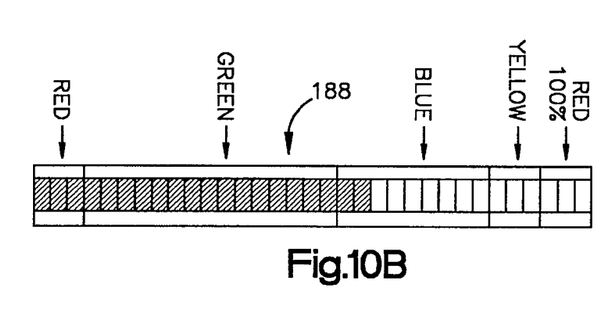
FIGS. 10B–10D illustrate various conditions of a load indicator forming part of the load moment display shown in FIG. 10A.
Figure 10C:
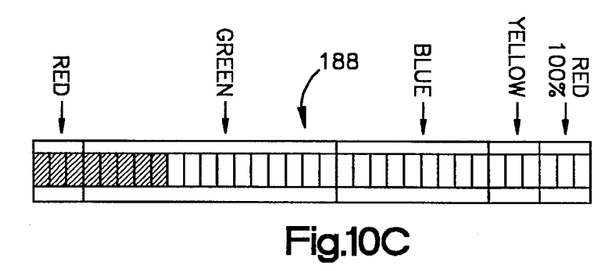
Figure 10D:
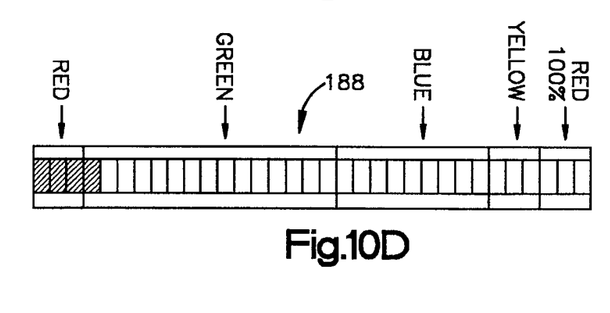

In the illustrated embodiment, the load indicator 188 is a color display that is divided into red, green, blue, yellow and red sections as seen in FIGS. 10B–10D. The extent of load is indicated by a lighted bar which moves rightwardly as viewed in FIGS. 10B–10D as the load increases. With the disclosed control, when the crane is at 60% capacity with the counterweight retracted, the indicator illuminates into the blue area (as seen in FIG. 10B). As this point, the load moment indicator 182 activates the solenoid valve 200 which will enable the operator to use the control 130 to extend the actuators 126. By moving the control 130 towards the left (as viewed in FIG. 9), pressurized fluid is communicated from the hydraulic supply 188 to the rod end 126b of the cylinder 126 which, in turn, extends the rod, thereby moving the counterweight assembly 32 rearwardly, i.e., away from the crane. When the counterweight reaches its extended position as sensed by the rear position sensor 196, the load moment indicator 182 changes the bar display to the condition illustrated in FIG. 10C where the green section of the indicator is illuminated. With the counterweight 32 extended, the capacity of the crane is enhanced and thus the percent of rated load capable of being lifted by the crane with the counterweight extended is greater. This is reflected in the bar indicator 188 by virtue of illuminating only a portion of the green section.

Once the load is at the required location, the operator may set the load in place. Because the counterweight is in the extended position, the load can only be partially set in place since totally unloading the boom would result in instability since the counterweight is in the extended position. Partially setting the load is reflected in FIG. 10D where the bar indicator has moved further towards the left red area. If the operator does not stop before reaching the red area, the load moment indicator 182 energizes the main hoist brake to prevent lowering of the load and the boom up function is rendered inoperative. In order to fully lower the load, the operator must fully retract the counterweight as sensed by the forward position sensor 194. Once the counterweight 32 is fully retracted, the main hoist brake is released and the boom up function is enabled, allowing the load to be fully released by the crane. During the retraction process, the control system automatically retracts the actuators 142 in order to move the stabilization foot 162 into the counterweight assembly, i.e., the position shown in FIG. 2.

With the disclosed control arrangement, the enhanced lifting capability of the crane can be easily manipulated by the operator. Instances of unstable conditions are reduced by the load moment indicator 182 which functions to disable or inhibit operation of certain components such as the counterweight extension actuators 126 if extension of the actuators would produce instability in the crane.

Returning now to FIG. 9, as described above, the counterweight assembly 32 is self installing in that it includes actuators 142 which interact with the crane in order to position and mount the counterweight onto the counterweight extension arms 34. During the counterweight installation process, the separate tethered control box 144 is used by a crane installer/operator to control the extension and retraction of the actuators 142. During actual crane operation, however, the extension and retraction of the actuators 142 in order to effect lowering of the foot 162 is controlled by a crane mounted control system. The control box 144 is disabled during normal crane operation and would typically be stowed in a compartment forming part of the counterweight of assembly 32 or alternately removed. During crane operation, when the counterweight 32 is to remain adjacent the rear of the crane, it is preferred that the control system for lowering or raising the foot 162 be disabled.

In the preferred and illustrated embodiment, the counterweight assembly 32 includes a multi-position switch which is shown schematically and indicated by the reference character 210. As described above, prior to installing the counterweight assembly 32, a connection 140 is made between the counterweight 32 and the rear of the crane. The connection 140 include both hydraulic and electrical conduits and cables. The cable 140 may be routed through one of the counterweight support beams 34. A conventional cable take-up mechanism or spool may be used to maintain control of the cable as the beams 34 are extended.

The switch 210 may be either an electrical or hydraulic or combination switch. During actual counterweight installation, the switch is moved to the lower position 210*a* which activates the control box 144. In this position, the control box 144 is used to control the application of pressurized fluid from the cable/conduit 140 to the actuators 142. After installation, the switch is normally moved to the center position 210*b* which disables the actuators 142 so they cannot be extended or retracted either by the control box 144 or by a control system forming part of the crane.

If the crane is to be operated with the counterweight extended, the switch 210 is moved to the upper position 210*c* which then allows the actuators 142 to be operated by the crane mounted control system which, as shown in FIG. 9, may include the load moment indicator 182. In the preferred embodiment, whenever the counterweight is extended (as permitted and controlled by the load moment indicator 182), the actuators 142 are energized automatically to lower the foot 162 when the beams 34 have been extended rearwardly, a predetermined distance, i.e., only after the foot has cleared the barbody 12. Conversely, the foot 162 is automatically retracted whenever the counterweight is withdrawn.

Although the invention has been described with a certain degree of particularly, it should be understood that those skilled in the art can make various changes to it without departing from the spirit or scope of the invention as hereinafter claimed.

We claim:

1. For use with a crane having upper and lower works, a boom and load lifting assembly mounted on said upper works, boom and load hoist machinery mounted on said upper works, wherein the improvement is a frame structure for supporting the boom and load hoist machinery comprising:

a pair of spaced apart parallel frame members;

each of said frame members including a pair of substantially vertical side plates spaced apart by at least one elongate lateral cross piece, each pair of side plates including integral, parallel flange sections extending upwardly and located above said cross piece, means for interconnecting said frame members;

each pair of said flange sections of each frame member include spaced apart mounting locations for directly mounting and supporting one side of said boom and load hoist machinery, said boom and load hoist machinery spanning a region between said frame members;

said mounting locations including apertures formed in said flange sections, fastening members for interconnecting said boom and load hoist machinery with said apertures;

drip pans extending laterally from said frame members and located below said flange sections, said drip pans being operative to received discharged material from said boom and load hoist machinery;

a portion of each frame member below said cross piece forming an integral housing;

an extendable beam slidably supported within each of said housings;

actuating means for extending and retracting said beams with respect to said frame members; and a counterweight assembly attached to said beams, such that extending and retracting said beams by said actuating means moves said counterweight assembly relative to said upper and lower works.

2. The improvement of claim 1 further comprising:

a stabilizer for said counterweight assembly, means for selectively connecting said stabilizer to either said upper works or said counterweight assembly for vertical movement between a first position to a second position vertically spaced above said first position.

* * * * *